(12) United States Patent
Schmit

(10) Patent No.: US 11,498,081 B2
(45) Date of Patent: Nov. 15, 2022

(54) DRYING HOPPER AS WELL AS GRINDING AND DRYING PLANT COMPRISING SUCH

(71) Applicant: PAUL WURTH S.A., Luxembourg (LU)

(72) Inventor: Louis Schmit, Luxembourg (LU)

(73) Assignee: PAUL WURTH S.A., Luxembourg (LU)

( * ) Notice: Subject to any disclaimer, the term of this patent is extended or adjusted under 35 U.S.C. 154(b) by 265 days.

(21) Appl. No.: 16/767,002

(22) PCT Filed: Dec. 6, 2018

(86) PCT No.: PCT/EP2018/083857
§ 371 (c)(1),
(2) Date: May 26, 2020

(87) PCT Pub. No.: WO2019/110753
PCT Pub. Date: Jun. 13, 2019

(65) Prior Publication Data
US 2020/0391221 A1   Dec. 17, 2020

(30) Foreign Application Priority Data
Dec. 7, 2017 (LU) .................................. LU100534

(51) Int. Cl.
*B02C 21/00* (2006.01)
*F26B 1/00* (2006.01)
(Continued)

(52) U.S. Cl.
CPC .............. *B02C 21/00* (2013.01); *F26B 1/005* (2013.01); *F26B 3/06* (2013.01); *F26B 9/063* (2013.01);
(Continued)

(58) Field of Classification Search
CPC .. F26B 1/005; F26B 3/06; F26B 9/063; F26B 21/004; F26B 2200/08; B02C 21/00; Y02P 70/10
(Continued)

(56) References Cited

U.S. PATENT DOCUMENTS 2,458,412 A * 1/1949 Payne ........................ B01J 8/12
422/216
2,458,434 A * 1/1949 Simpson .................... B01J 8/12
422/612
(Continued)

FOREIGN PATENT DOCUMENTS

CA       263206 A      8/1926
CN    101017053 A      8/2007
(Continued)

OTHER PUBLICATIONS

International Search Report dated Mar. 18, 2019 re: Application No. PCT/EP2018/083857, pp. 1-4, citing: US 3 159 467 A, WO 2017/102810 A1, WO 2010/062526 A1, CA 263 206 A and US 4 615 718 A.
(Continued)

*Primary Examiner* — Jessica Yuen
(74) *Attorney, Agent, or Firm* — Cantor Colburn LLP

(57) ABSTRACT

A drying hopper for drying granular material includes a hopper casing defining a plenum chamber for granular material, and an upper part and a bottom part. The hopper also includes a material inlet for the granular material arranged in the upper part; a material outlet port at the bottom part; a component for introducing hot drying gas into the hopper casing; and a gas outlet arranged in the upper part. The component for introducing hot drying gas includes gas pipes arranged to extend substantially vertically in the upper part, each gas pipe having a gas outlet port at its lower end and being connected at its upper end to an annular gas
(Continued)

duct having a gas inlet for receiving a flow of drying gas, the gas pipes being distributed on the annular gas duct.

17 Claims, 2 Drawing Sheets

(51) Int. Cl.
*F26B 3/06* (2006.01)
*F26B 9/06* (2006.01)
*F26B 21/00* (2006.01)

(52) U.S. Cl.
CPC ........ *F26B 21/004* (2013.01); *F26B 2200/08* (2013.01)

(58) Field of Classification Search
USPC .......................................................... 34/168
See application file for complete search history.

(56) References Cited

U.S. PATENT DOCUMENTS

| 3,159,467 | A |   | 12/1964 | Pender |
| 4,325,192 | A |   | 4/1982 | Jochumsen et al. |
| 4,458,428 | A | * | 7/1984 | Saeman ................ C03B 1/02 34/232 |
| 4,615,718 | A |   | 10/1986 | Seng |

FOREIGN PATENT DOCUMENTS

| CN | 102216339 | A |   | 10/2011 |
| CN | 102455114 | A |   | 5/2012 |
| CN | 202547309 | U |   | 11/2012 |
| CN | 106221717 | A |   | 12/2016 |
| CN | 107300316 | A |   | 10/2017 |
| EP | 0350349 | A1 | * | 1/1990 |
| GB | 1172523 | A |   | 12/1969 |
| JP | S54124366 | A |   | 9/1979 |
| JP | S54142654 | A |   | 11/1979 |
| JP | H022017777 | A |   | 8/1990 |
| JP | 2013088015 | A |   | 5/2013 |
| JP | 2013221636 | A |   | 10/2013 |
| JP | 2015045431 | A |   | 3/2015 |
| WO | 2010062526 | A1 |   | 6/2010 |
| WO | 2017102810 | A1 |   | 6/2017 |

OTHER PUBLICATIONS

Written Opinion dated Mar. 18, 2019 re: Application No. PCT/EP2018/083857, pp. 1-5, citing: US 3 159 467 A, WO 2017/102810 A1 and WO 2018/102810 A1.
CN Office Action dated Sep. 8, 2021 re: Application No. 2018800790815, pp. 1-13, citing: CN102455114A, CN102216339A, CN202547309U, GB1172523A, U.S. Pat. No. 4325192A, CN101017053A, CN106221717A and CN107300316A.
JP Office Action dated Aug. 23, 2022 re: Application No. 2020-531092, pp. 1-4, citing: JPS54-124366, JP2015-045431, JPS54-142654, JPH02-2017777, JP2013-088015, JP2013-221636 and WO2017/102810.

* cited by examiner

DRYING HOPPER AS WELL AS GRINDING AND DRYING PLANT COMPRISING SUCH

TECHNICAL FIELD

The present disclosure generally relates to drying hoppers for drying granular materials of various types. Such drying hoppers can be used in a number of applications and in particular in a grinding and drying plant.

BACKGROUND ART

Granular materials are used in a variety of industries and can be made from a diversity of materials, e.g. mineral, organic or synthetic. Most of the granular materials include noticeable quantities of entrained moisture, and some of them even exhibit hygroscopic properties.

Therefore, granular materials are conventionally preheated and dried in drying hoppers by blowing there through a heated (dry) air or more generally a drying gas. The drying gas typically enters the drying hopper via a double bottom or nozzles located in the lower/tapering part of the hopper. The dry air flows upward through the granular charge, heating the granular material and removing humidity. The humid air then leaves the hopper through an outlet in its roof.

For many industrial processes, the drying and/or pre-drying of the bulk material is critical as it may affect the performance, efficiency and/or safety of the process.

Let us e.g. take an example in the iron making industry. WO 2017/102810 discloses, e.g., the pre-drying of raw material, especially of raw coal, upstream a Grinding and Drying Plant. Indeed, an increasing content of moisture in the raw material to be processed, i.e. to be ground and dried, has a negative impact on the capacity of the pulverizer. In other words, the maximum possible output of the pulverizer decreases as the moisture content of the raw material increases (above a given moisture content threshold value).

By means of pre-drying the raw material in a drying hopper upstream of the pulverizer, the required capacity and thus the size of the pulverizer to be installed can be reduced. The required drying capacity and thus the drying gas flow rate in the Grinding and Drying Plant can be reduced as well, thus reducing the sizes and capacities especially of the process gas pipes, of the equipment for separating the waste drying gas from the dried solid material (e.g. multiple cyclone or bag filter) and of the drying gas main fan.

In the Plant configuration of WO 2017/102810, the hot pre-drying gas is injected into the drying hopper through several nozzles (on one or more levels) on the outer circumference of the cylindrical or truncated lower conical part of the Hopper casing. Although very common, it has been observed that this kind of arrangement does not always permit uniform drying of the granular material, due to particular flow patterns of the drying gas. That is, some part of the raw material will not be—or only slightly—pre-dried, while the other part of the material may have been close to fully dried or even over-heated. In case this non-uniformly pre-dried material is not homogenized while being discharged into the downstream pulverizer, operating conditions of the pulverizer may become fluctuating to erratic and result in inhomogeneous pulverized material properties.

SUMMARY

The present disclosure provides a drying hopper of improved design, in particular permitting a more homogeneous drying of the granular material charge.

The present disclosure lies on the finding that the conventional arrangement of drying hoppers, as e.g. shown in WO 2017/102810, and the gas flow pattern resulting out of it conflict with the assumption of a flow-through pre-drying device, where gas and solid material basically flow/move in counter-flow directions.

In fact, the present inventor has observed that the pre-drying gas injected through the outer walls of such pre-drying hopper travels through the raw material more in a crossflow direction. This results in that a part only of the raw material flow (the one on the outmost annulus in the Hopper horizontal cross-section) is continuously "hit" by pre-drying gas at inlet temperature level, while raw material descending more in the central area of the hopper is continuously in contact with pre-drying gas of lower temperature levels and probably at reduced flow rate. As a consequence, depending on the operating circumstances, pre-drying may not be uniform, part of the raw material may be not or only slightly predried, while other material may have been close to fully dried or even over-heated. As mentioned above, the use of such non-uniformly pre-dried material may lead to fluctuant, erratic or even unsafe operating condition in the subsequent process/treatment steps.

To address the above problem, the present disclosure proposes a drying hopper for drying granular material comprising:

a hopper casing defining a plenum chamber for granular material, and having an upper part and a bottom part;

a material inlet for the granular material arranged in said upper part;

a material outlet port at said bottom part;

means for introducing hot drying gas into said hopper casing; and a gas outlet arranged in said upper part.

According to an important aspect of the disclosure, the means for introducing hot drying gas include a plurality of gas pipes arranged to extend substantially vertically in the upper part, each gas pipe having a gas outlet port at its lower end and being connected at its upper end to an annular gas duct having a gas inlet for receiving a flow of drying gas, the gas pipes being distributed on the annular gas duct. The gas pipes advantageously extend downwardly to a zone between 25% to 50% of the casing height (H).

As explained in the context of the prior art, the peripheral introduction of drying gas in the conventional drying hoppers raises problems of uniformity of treatment. The gas tends to remain at the outer periphery of the hopper, so that only reduced flow rates of drying gas reach the center part of the hopper, at reduced temperatures.

By contrast, the present drying hopper comprises an improved means for introducing hot drying gas into the drying hopper. The use of a set of vertical gas pipes allows introducing a plurality of hot drying gas streams in the granular material, at desired locations to promote a more homogeneous flow through the granular material. Furthermore, since the gas pipes extend into the upper part of the casing, part of the granular material will already get pre-heated in contact with the gas pipes and with the annular gas duct (when mounted inside the casing).

Pre-drying gas is expected to mainly flow in a vertical upward direction through the raw material, thus producing a more homogenous pre-drying in the raw material travelling in a vertical downward direction through the Hopper. Complete drying and overheating of part of the raw material are avoided. Hot drying gas distribution piping, installed inside the hopper, does not require outer heat insulating. Heat losses are transferred to the waste pre-drying gas leaving the hopper and balanced by the waste pre-drying gas outlet temperature control. Hot drying gas is in contact neither with the hopper casing nor with the clearing arm emptying conveyor that may be provided at the casing bottom, which are largely protected against significantly higher temperature levels by wet or pre-dried raw material.

Such a design of drying hopper is particularly interesting for hoppers having a shape ratio (height over diameter) of 1.5 and below. The plurality of annularly/circumferentially distributed gas pipes bring the flow of hot drying gas at a plurality of locations at the heart of the granular material.

The number of gas pipes and their inner cross section area may be determined, e.g., based on a fluid dynamic calculation or simulation in consideration of the properties of the raw material. As it is known in the art, the actual distribution of the pre-drying gas inside the raw material is mainly conditioned by the properties of the raw material, primarily the grain size distribution.

The annular gas duct is preferably arranged inside the casing, in the upper part. However the annular gas duct could be arranged outside the casing, with the vertical gas pipes passing through the roof of the casing.

A certain number of vertical gas pipes are provided on the annular gas duct. In embodiments, at least four such gas pipes are connected to the annular gas duct and are preferably equally spaced.

The gas pipes may be arranged on a virtual circle (38.1) having a diameter of between 0.45 and 0.75, more preferably between 0.50 and 0.65 times the internal diameter of said casing.

In embodiments, the gas pipes are straight tubes open at both ends. In other embodiments, the gas pipes comprise a downwardly widening lower portion. In particular, the gas pipes may be formed as flattened conical pipes, whereby the narrow end is connected to the annular gas duct and the gas pipes delivers a gas blade at its outlet port.

In embodiments, the lower portion of the gas pipe may be equipped with throttling means for adapting the outlet velocity of the hot drying gas leaving the pipe. Such throttling means are preferably arranged inside the gas pipes.

A material distribution member, in particular a distribution cone, is arranged advantageously below the material inlet for spreading the granular material. The annular gas duct and distribution member are preferably concentrically arranged, for example at about the same height.

In embodiments, the drying hopper may comprise one or more of the following features:
said material inlet is centrally arranged in a roof of said hopper casing;
said material inlet includes a nozzle;
said casing has a substantially flat bottom wall, in which said material outlet port is preferably centrally arranged;
a diverter element is spaced from the casing bottom wall and arranged to cover the material outlet;
collecting means arranged in the bottom part to force granular material towards the material outlet;
said gas pipes comprise a downwardly widening lower portion.

These and other embodiments of the present disclosure are recited in the appended dependent claims.

According to another aspect, the disclosure also concerns a grinding and drying plant for producing a comminuted dry material from a coarse material, the grinding and drying plant comprising:
a source of heated drying gas for providing heated drying gas at a predefined temperature;
a comminuting equipment for comminuting and drying the coarse material to obtain a comminuted dry material;
a drying hopper according to the first aspect of the disclosure, provided upstream of the comminuting equipment for drying the coarse material;
conveying means for conveying the coarse material from the drying hopper into the comminuting equipment;
conduits for feeding heated drying gas into the comminuting equipment and to the drying hopper; and
a separator downstream of the comminuting equipment for collecting and separating the comminuted dry material from the drying gas.

BRIEF DESCRIPTION OF THE DRAWINGS

Further details and advantages of the present disclosure will be apparent from the following detailed description of several not limiting embodiments with reference to the attached drawings in which.

DETAILED DESCRIPTION OF THE DRAWINGS

Figure 1:
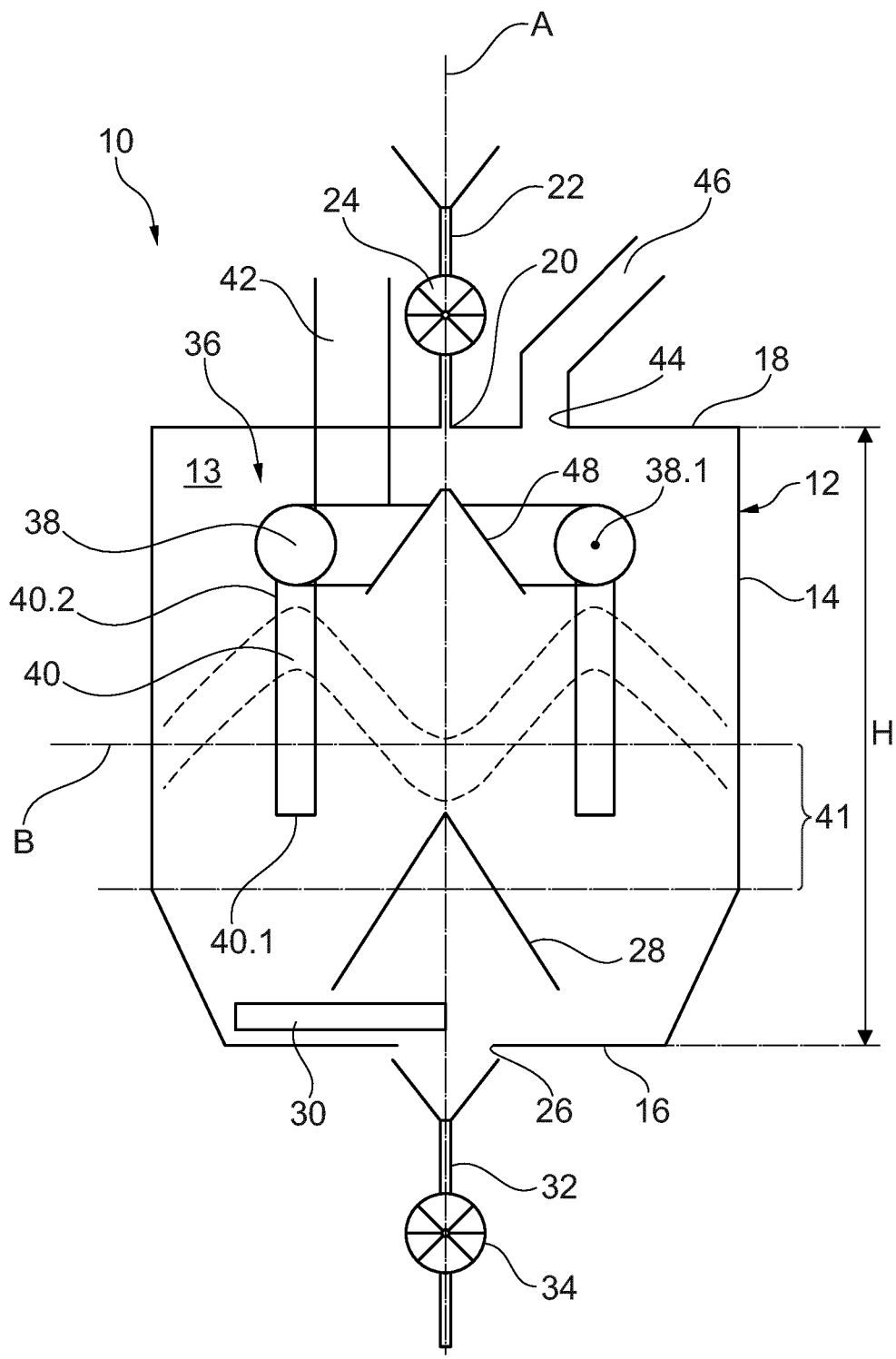
FIG. 1 is a sketch of an embodiment of the present drying hopper.

FIG. 1 is a principle drawing of the present drying hopper 10. It comprises a casing 12 having a generally tubular outer wall 14 extending along central axis A, which is closed at both ends, respectively by a bottom wall 16 and an upper wall 18 or roof. The outer wall 14 is preferably circular and slightly tapers (truncated conical part) in the lower part of the casing. This is however not limiting and the outer wall may have a rectangular or square cross-sectional shape.

The casing 12 defines a plenum chamber 13 for the granular material temporarily stored therein for drying purposes. A material inlet 20 for the granular material is arranged in the upper part of the casing, in particular in the center of the roof 18. Granular material is supplied via a feed pipe 22 that is connected to inlet 20. A nozzle (not shown) is advantageously mounted in material 20 for a direct connection between the end of feed pipe 22 and the nozzle inlet. In use, the feed pipe 22 may typically be connected to an upstream storage bin (not shown), containing the material to be dried in drying hopper 10. A rotary valve 24 may be arranged on feed pipe to control the flow of granular material to the drying hopper 10 and prevent disturbing effects of a different from atmospheric, positive or negative pressure inside the hopper upper part on the operation of the upstream storage bin.

Reference sign 26 designates a material outlet at the bottom part. In this variant, the bottom wall 16 is flat and the material outlet is centrally arranged therein along Axis A. Granular material arriving through inlet 20 will gravitarily fall into hopper 10 and accumulate therein.

A deflector 28 is arranged in the lower part above the bottom wall 16, and spaced therefrom, in such a way as to cover the outlet port 26. In this variant, the deflector 28 has a conical shape and has a circumference greater than that of the outlet port 26. This avoids that a column of material forms at the vertical above the outlet port 26. To the contrary, the granular material will rest on the flat bottom 16, at the periphery of the deflector 28. A collecting means, here a horizontal scraper or clearing arm 30, is provided to push the material towards the outlet port 26. The scraper may typically be designed as a horizontal blade mounted on a pivoting shaft entrained by an electric motor assembly.

In use, a discharge pipe 32 is typically connected to the outlet port 26 in order to forward the dried granular material to a subsequent station of treatment or of use, depending on the application/process. A rotary valve 34 allows regulating the flow out through discharge pipe 32 and preventing disturbing effects of a different from atmospheric, positive or negative pressure inside the hopper lower part on the operation of the downstream equipment, typically a pulverizer.

Reference sign 36 generally designates means for introducing hot drying gas into the hopper casing, which comprise an annular gas duct 38 and a number of gas pipes 40 that are arranged to extend substantially vertically in the upper casing part. Each gas pipe 40 has a gas outlet port 40.1 at its lower end and is connected at its upper end to the annular gas duct. The annular gas duct 38 has a gas inlet (not shown) for receiving a flow of drying gas from a main gas supply duct 42 passing through roof 18. In the embodiment the annular gas duct 38 is a circular duct having a round cross-section (torus)—this is however not limiting and other shapes can be envisaged.

A gas outlet 44 is arranged in the upper part, namely in roof 18. A gas discharge pipe 46 is connected to gas outlet 44 to carry away the waste drying gas to filtering equipment before discharge to atmosphere.

A distribution member 48 is arranged below the material inlet 20, preferably centrally aligned on axis A. The distribution member 48 is shaped in order to radially spread the material falling thereon. It takes here the form of a cone, but could be shaped as a dome or bell or any other functionally similar shape.

Distribution member 48 is configured to fit inside the annular gas duct 38, at about the same height. Hence material arriving from the material inlet 20 falls on the distribution member 48 and is directed radially below the annular gas duct 38, towards the vertical gas pipes 40.

As used herein, the term upper part and lower part designated respectively the hopper regions above and below the center line B (mid-distance between upper and lower walls).

For an improved distribution of drying gas, the gas pipes 40 may be arranged on a virtual circle having a diameter of between 0.45 and 0.75, more preferably between 0.50 and 0.65 times the internal diameter of said casing. This virtual circle in FIG. 1 corresponds to the annular center line, noted 38.1, of annular gas duct 38.

Preferably, the gas pipes extend downwardly to a zone between 25% to 50% of the casing height (H); this zone, or horizontal band, is indicated 41 in the figure. It may be noticed here that although the gas pipes 40 extend through the upper part (i.e. at least part of the upper part) to be contact with the inlet flow of granular material, the outlet ports 40.1 of the gas pipes 40 may often be located in the lower part (below mid-height line B), their outlets 40.1 being located in horizontal band 41.

Figure 2:
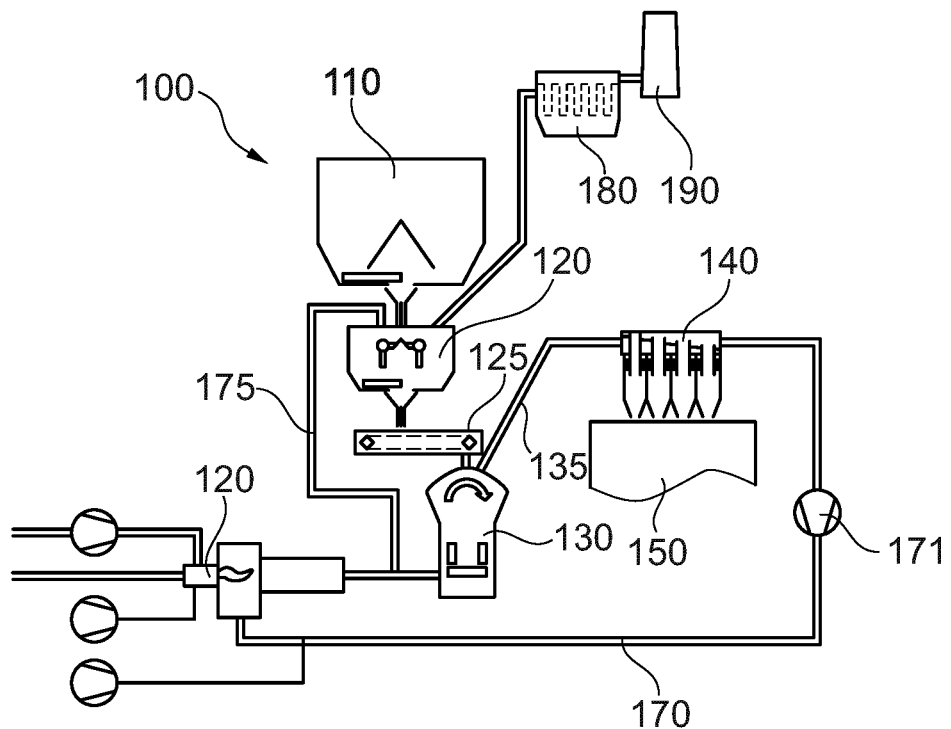
FIG. 2: is a diagram of an embodiment of a grinding and drying plant featuring the drying hopper of FIG. 1,
FIG. 3: is a sketch of an alternative design of the annular gas duct with gas pipes.

Turning now to FIG. 2, it relates to an application of the present drying hopper in the context of grinding and drying plant 100. In particular the drying hopper is used in plant 100 as a pre-drying hopper for wet coarse bulk material, e.g. coal or slag that is processed in the plant 100.

In the grinding and drying plant 100, the raw material, e.g. coarse slag or coal, is stored in a raw material storage bin 110 upstream the mill 130. The present drying hopper, e.g. the hopper presented in FIG. 1, designated 120, is interposed between the storage bin 110 and the mill 130. In order to be processed into dried pulverized material, e.g. pulverized slag or coal, the pre-dried raw material may be supplied from the drying hopper 120 to the mill 130 by means of a variable speed (variable capacity) conveyor 115, e.g. a variable speed drag chain conveyor and/or a rotary valve.

The remainder of the plant 100 is rather conventional and similar to known grinding and drying plants, see e.g. WO 2017/102810.

Drying energy is supplied by a variable capacity drying gas generator 120, fired with a combustible gas. As far as available, the combustible gas is preferably a low calorific value gas with low hydrogen content, e.g. blast furnace gas. Low hydrogen content limits the water vapor content of the drying gas produced, thus increasing the drying efficiency. The drying gas generator 120 generally also includes a combustion air fan and an additional low capacity burner for high calorific value combustion gas, e.g. natural gas or coke oven gas, required for heating up the plant and possibly for supporting the combustion of the low calorific value combustion gas.

Conventionally, as the close to stoichiometric combustion—avoiding high oxygen concentration in the flue gas—even of a low calorific value combustion gas—results in hot flue gas temperature levels in the order of magnitude of 1000° C. and above, i.e. several times higher than what may be acceptable inside the mill and in contact with the wet raw material, especially coal, to be dried, the hot flue gas produced inside the drying gas generator 120 has to be mixed up with a large flow rate of recycled waste drying gas, of about 100° C. The recycled waste drying gas arrives from conduit 170. This will allow obtaining an appropriate drying gas temperature in front of the mill 130, in the range of about 200 to below 400° C. in case of coal, the actual value required being primarily conditioned by the moisture content of the raw material.

In typical grinding and drying plants 100, comminution, normally grinding, and drying of the raw material is performed, largely in parallel, inside the mill 130. Material is ground e.g. between rotating rollers, balls etc., and a rotating grinding table or bowl, and moisture is evaporated in contact with the hot drying gas. The drying gas conveys the ground material into a classifier, usually integrated into the top part of the mill 130. Coarse material is eliminated from the drying gas flow and returned onto the grinding table or bowl, the fine (comminuted) material is transported by the cooled-down waste drying gas with increased water vapor content through conduit 135 into a downstream equipment 140 for gas-solid-separation, here a multiple cyclone, although a usual bag filter may be used.

Pulverized material separated from the waste drying gas by equipment 140 is transferred to a downstream storage or conveying equipment 150, e.g. a fine material/product (pulverized coal) storage bin, a conveying hopper, a powder pump etc.

It may be noticed that the waste drying gas is recycled through conduit 170 to the drying gas generator 120 and mixed with hot flue gas to produce hot drying gas with the appropriate mill inlet temperature level. A larger part of this hot drying gas is then generally supplied to the mill 130, the balance being supplied to the pre-drying hopper 120 via conduit 175 and to be injected therein. As explained in relation to FIG. 1, the hot drying gas injected into pre-drying hopper 120 flows through the raw material bed, heats the raw material up, evaporates part of the raw material moisture, is cooled down and leaves the hopper 120 at the top.

The waste drying gas leaving the pre-drying hopper 120 is cleaned in a downstream off-gas bag filter 180 and finally released into atmosphere through off-gas stack 190; the fine solid material separated from the off-gas is transferred into the fine material/product bin 150. The raw material of decreased moisture content is transferred from the pre-drying hopper 120 into the mill 130, to be processed into dried fine material.

The pre-drying hopper 120 allows reducing raw material moisture content upstream of the mill 130, resulting in a reduced drying gas flow rate to be supplied to the mill 130 (within the limits of the drying gas flow rate range fixed by the mill), (as conditioned by this drying gas flow rate) a reduced gas-solid-separation equipment 140 capacity and size, a reduced through-put of the drying gas main fan 171 and finally a reduced mill 130 size.

The pressure level in the circuit is generally controlled (via the control of the off-gas flow) in such a way as to have downstream the drying gas generator 120 and upstream the mill 130 and the raw material storage bin 120 an appropriate overpressure level for conveying the given drying gas flow rate through the raw material storage bin 120 and the downstream bag filter 180 and stack 190 (off-gas pipe) into atmosphere.

DISCUSSION

Let us get back to the prior art. As indicated above, WO 2017/102810 discloses the pre-drying of raw material, especially of raw coal, upstream a Grinding and Drying Plant. By means of pre-drying the raw material in a drying hopper upstream the pulverizer, the required capacity and thus the size of the pulverizer to be installed can be reduced. The required drying capacity and thus the drying gas flow rate in the Grinding And Drying Plant can be reduced as well, thus reducing the sizes and capacities especially of the process gas pipes, of the equipment for separating the waste drying gas from the dried solid material (e.g. multiple cyclone or bag filter) and of the Drying Gas Main Fan.

In the Grinding And Drying Plant of WO 2017/102810 (see FIG. 2), the pre-drying of raw material has been ab initio integrated upstream the Pulverizer. Pre-drying Gas and Drying Gas are produced together in the same Drying Gas Generator. In case of a capacity increase of an already existing Grinding And Drying Plant, based on the addition of pre-drying equipment, the off-gas of the existing Plant would be supplied by a new Drying Off-Gas Fan to a new Pre-drying Gas Generator, heated up to the pre-drying gas inlet temperature by addition of hot flue gas produced in that Pre-drying Gas Generator, and then directed into the pre-drying equipment proper.

Pre-drying has been proposed to be performed inside a Pre-Drying Hopper, operated as a flow-through dryer, i.e. hot pre-drying gas flows basically in a vertical upward direction through the bulk material contained in the Hopper while this bulk material slowly descends in a vertical downward direction. As gas travels through the bulk material, heat is transferred from the gas onto the solid material, solid material and liquid moisture are heated up and surface moisture is partly evaporated and entrained by the gas. Cooled-down pre-drying gas with increased moisture content leaves the Hopper on top, pre-dried and up-heated (to a limited extent) solid material is discharged at the bottom of the Hopper and fed into the downstream pulverizer.

Pre-drying conditions are strongly depending on the grain size distribution of the raw material. The finer this raw material is, the larger the heat and vapor exchange surface area per unit volume of material is. On the other hand, the temperature of the cooled-down pre-drying gas, leaving the Hopper, has to be maintained at a level high enough to avoid any input of liquid water into the downstream bag filtering (or equivalent gas-solid separation) equipment, which is to clean the pre-drying gas before it is released into atmosphere. Which means—unless a reheating of the pre-drying off-gas downstream the Pre-drying Hopper is considered— that the heat and vapor exchange surface area inside the Hopper has to be controlled and limited, depending on the grain size distribution of the raw material, and thus ultimately the filling height of the raw material contained in the Hopper and crossed by the pre-drying gas.

The pre-drying energy rate to be transferred onto the raw material and the limitation to the pre-drying gas inlet temperature, conditioned by the temperature limitations from the material to be processed as well as from the equipment, result in a range of possible values for the pre-drying gas flow rate and thus in a value range for the Pre-drying Hopper inner cross section area and inner diameter, based on the ranges of acceptable values for the gas velocities inside the Hopper and the pressure losses resulting out of them.

The Pre-drying Hopper inner cross section area then conditions as well the Hopper filling level, to be controlled as discussed in the preceding paragraph. The required control and limitation of the height of the raw material filling involved in the pre-drying process, i.e. in the heat and mass (water vapor) transfer, has caused the split of the usual raw material containing equipment upstream the Mill into an upper Raw Material Storage Bin or Storage Hopper and a lower, downstream Raw Material Pre-drying Hopper, where actual pre-drying is performed inside and where the heat and mass transfer surface area and thus the filling height can easily be measured and controlled, depending on the heat and mass transfer conditions and the temperature levels resulting from them.

In order to limit the required height of both the Raw Material Storage Bin or Storage Hopper and the Raw Material Pre-drying Hopper, it has been proposed to equip each of them with a bottom clearing arm emptying device, thus avoiding extended, height consuming lower conical parts, which cause expensive additional steel structure, while offering only limited additional storage space.

In the pre-drying hopper of WO 2017/102810, the hot pre-drying gas is injected into the Pre-drying Hopper through several nozzles (on one or more levels) on the outer circumference of the cylindrical or truncated lower conical part of the Hopper casing. This arrangement and the gas flow pattern resulting out of it however conflict with the assumption of a flow-through pre-drying device, where gas and solid material basically flow/move in counter-flow directions, as described above. In fact, the pre-drying gas injected through the outer walls of the Pre-drying Hopper travels through the raw material more in a crossflow direction. This results in that a part only of the raw material flow (the one on the outmost annulus in the Hopper horizontal cross-section) is continuously "hit" by pre-drying gas at inlet temperature level, while raw material descending more in the central area of the Hopper is continuously in contact with pre-drying gas of lower temperature levels and probably at reduced flow rate. As a consequence, pre-drying will not be uniform, part of the raw material will be not or only slightly pre-dried, while other material may have been close to fully dried or even over-heated. In case this non-uniformly pre-dried material is not homogenized while being discharged into the downstream pulverizer, operating conditions of the pulverizer may become fluctuating to erratic and result in in-homogenous pulverized material properties. In addition at least the hot pre-drying gas injection nozzle areas of the Pre-drying Hopper shell have to cope with the inlet temperature level of the pre-drying gas.

Effects of the Invention

The present drying hopper, as explained e.g. in reference to FIG. 1 is based on an improved pre-drying gas inlet and distribution pattern, aiming at a more uniform gas and heat distribution, resulting in a more homogenous pre-drying. Raw material to be pre-dried is supplied through the central raw material inlet 20 in the hopper roof into the inside of the hopper 10 and spread by distribution cone 48 into the annular cylinder area bordering the hot drying gas pipes 40. Hot drying gas leaves the lower pipe outlets 40.1, penetrates into the bulk material, spreads out, flows upward through the bulk material, leaves the bulk material filled volume on top and finally flows out of the hopper through the waste pre-drying gas outlet 44 in roof 18. Pre-dried material is collected by the clearing arm conveyor 30 at the bottom part, and discharged through the central raw material outlet 26.

The raw material inlet flow rate may be typically controlled by means of speed variation of the rotary valve 24 above the Pre-drying Hopper raw material inlet nozzle, according a set point value for the pulverized coal output of the downstream Grinding And Drying Plant.

The capacity of the Pre-drying Gas Generator is controlled according a set point value for the pre-drying gas heat flow rate, conditioned by the pre-drying rate to be achieved and the raw material inlet flow rate. The raw material filling level inside the Hopper is controlled by means of speed variation of the bottom clearing arm emptying device in the lowest part of the Hopper, according a set point value for the waste pre-drying gas outlet temperature (The waste pre-drying gas outlet temperature is conditioned by the heat and mass transfer surface area in the bulk material and thus by the filling level).

Pre-drying gas is expected to mainly flow in a vertical upward direction through the raw material, thus producing a more homogenous pre-drying in the raw material travelling in a vertical downward direction through the Hopper. Complete drying and overheating of part of the raw material are avoided. Hot drying gas distribution piping, installed inside the Hopper, does not require outer heat insulating. Heat losses are transferred to the waste pre-drying gas leaving the Hopper and balanced by the waste pre-drying gas outlet temperature control. Hot drying gas is in contact neither with the Hopper casing nor with the clearing arm emptying conveyor, which are largely protected against significantly higher temperature levels by wet or pre-dried raw material.

The number of vertical hot drying gas pipes 40 and their inner cross section area, conditioning the velocity of the drying gas at the outlet of the pipes, may be determined, e.g. based on a fluid dynamic calculation or simulation.

In the embodiment of FIG. 1, the gas pipes 40 are simple straight pipes of circular cross section with two open ends: lower end 40.1 forms the outlet port and upper end 40.2 is connected to the annular gas duct 38, forming the inlet for the hot drying gas.

Figure 3:
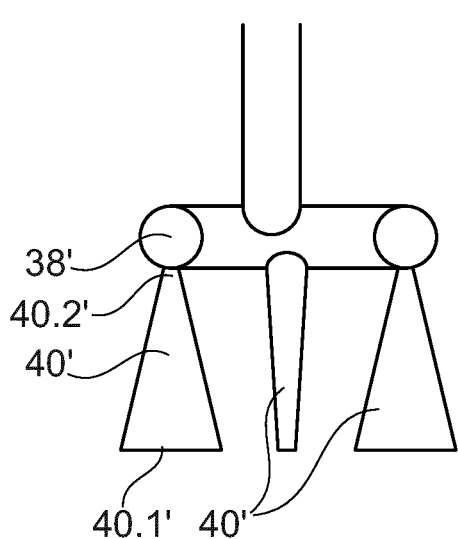

FIG. 3 shows a sketch of the means for introducing hot drying gas 30. The annular gas duct 30' is similar to that of FIG. 1. Here the gas pipes 40' are generally shaped as flattened conical pipes. As can be observed, the pipe 40' is a transition from a circular or squared inlet cross section at its upper end 40.2' to a slot-like outlet cross section at its lower end 40.1', the pipe 40' widening in the downward direction. The advantage of such shape is that the pre-drying gas flow is spread of a larger, annular disk shape gas distribution area as can be expected from down-pipes of round cross-section.

Figure 4:
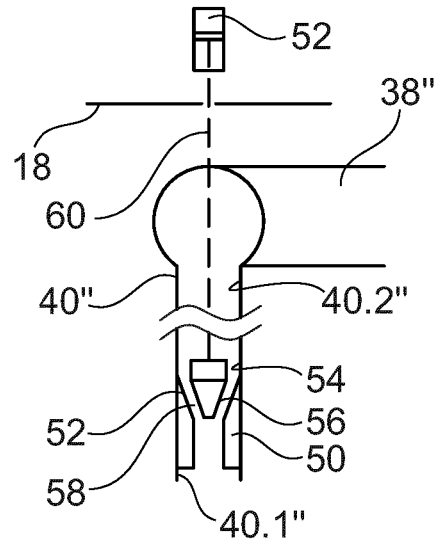
FIG. 4: is sketch of yet another embodiment of gas pipe for the means of introducing hot drying gas.

In some circumstance, namely in case the grain size distribution is not known or cannot be expected to remain unchanged during the operational lifetime of the drying hopper, it is advantageous to include in each vertical gas pipe means for adapting the outlet velocity of the hot drying gas leaving the pipe. One possible design of such means is illustrated at FIG. 4. One will recognize the annular gas duct 38" and a straight vertical pipe 40" with its upper end 40.2" connected to the gas duct 38" and its lower output end 40.1". In its lower part, pipe 40" includes an internal annular bulge 50 with a conical surface 52 oriented upwards (i.e. upstream). A throttling member 54 having a conical lateral surface 56 cooperates with the bulge surface 52 to define an annular passage 58 for the drying gas. The throttling member 54 is axially moveable in pipe 40" relative to the bulge, thereby allowing varying the width of the annular passage 58 and thus regulating the outlet velocity and consequently the distribution radius of hot drying gas discharged at the pipe outlet port 40.1". The axial/longitudinal displacement of the throttling member 54 can e.g. be operated by means of a rod 60, represented by a dotted line in FIG. 4, extending through pipe 40" and annular duct 38", through the upper hoper part and via the roof 18. Rod 50 may be associated to an actuator 52 arranged outside the hopper.

It may be noted that raw material filled into the Hopper and descending downward can produce large loads especially onto the vertical hot gas pipes 40. The pipes 40 may therefore be reinforced by radially arranged stiffening ribs and/or stabilized by means of bracing, using e.g. tensioning and pressure rods of appropriate shape.

The invention claimed is:

1. A drying hopper for drying granular material comprises:
    a hopper casing defining a plenum chamber for granular material, and having an upper part and a bottom part, said casing having a casing height;
    a material inlet for the granular material arranged in said upper part;
    a material outlet port at said bottom part;
    means for introducing hot drying gas into said hopper casing;
    a gas outlet arranged in said upper part;
    wherein said means for introducing hot drying gas include a plurality of gas pipes arranged to extend substantially vertically in the upper part and extend downwardly to a zone between 25% to 50% of the casing height, each gas pipe having a gas outlet port at its lower end and being connected at its upper end to an annular gas duct having a gas inlet for receiving a flow of drying gas, the gas pipes being distributed on the annular gas duct.

2. The drying hopper according to claim 1, wherein said gas pipes are arranged on a virtual circle having a diameter of between 0.45 and 0.75, or between 0.50 and 0.65, times the internal diameter of said casing.

3. The drying hopper according to claim 1 or 2, wherein said annular gas duct is arranged inside said casing in said upper part.

4. The drying hopper according to claim 1, wherein at least four gas pipes are connected to the annular gas duct and are equally spaced.

5. The drying hopper according to claim 1, wherein said material inlet is centrally arranged in a roof of said hopper casing.

6. The drying hopper according to claim 1, wherein said material inlet includes a nozzle.

7. The drying hopper according to claim 1, wherein a material distribution member is arranged below said material inlet for spreading the granular material.

8. The drying hopper according to claim 7, wherein the annular gas duct and distribution member are concentrically arranged.

9. The drying hopper according to claim 8, wherein the annular gas duct and distribution member are arranged at about the same height.

10. The drying hopper according to claim 7, wherein said material distribution member comprises a distribution cone.

11. The drying hopper according to claim 1, wherein said casing has a substantially flat bottom wall.

12. The drying hopper according to claim 1, wherein a diverter element is spaced from the casing bottom wall and arranged to cover the material outlet.

13. The drying hopper according to claim 1, comprising collecting means arranged in the bottom part to force granular material towards the material outlet.

14. The drying hopper according to claim 1, wherein said gas pipes comprise a downwardly widening lower portion.

15. The drying hopper according to claim 14, wherein said gas pipes are formed as flattened conical pipes, whereby the narrow end is connected to the annular gas duct and the gas pipes delivers gas blade at its outlet port.

16. The drying hopper according to claim 1, wherein the lower portion of the gas pipe is equipped with throttling means for adapting the outlet velocity of the hot drying gas leaving the pipe.

17. A grinding and drying plant for producing a comminuted dry material from a coarse material, the grinding and drying plant comprising:
 a source of heated drying gas for providing heated drying gas at a predefined temperature;
 a comminuting equipment for comminuting and drying the coarse material to obtain a comminuted dry material;
 a drying hopper according to claim 1, provided upstream of said comminuting equipment for drying said coarse material;
 conveying means for conveying the coarse material from the drying hopper into the comminuting equipment;
 conduits for feeding heated drying gas into the comminuting equipment and to the drying hopper;
 a separator downstream of the comminuting equipment for collecting and separating the comminuted dry material from the drying gas.

* * * * *